United States Patent [19]

Ravas, Jr. et al.

[11] Patent Number: 5,420,790
[45] Date of Patent: May 30, 1995

[54] ENERGY RESERVE CIRCUIT FOR SUPPLEMENTAL INFLATABLE RESTRAINT

[75] Inventors: Richard J. Ravas, Jr.; Kevin D. Kincaid, both of Kokomo, Ind.

[73] Assignee: Delco Electronics Corporation, Kokomo, Ind.

[21] Appl. No.: 208,178

[22] Filed: Mar. 10, 1994

[51] Int. Cl.⁶ .................. B60R 21/16; B60R 21/22
[52] U.S. Cl. .................. 364/424.05; 340/436; 280/735; 180/282; 307/10.1
[58] Field of Search .......... 364/424.05; 340/436, 340/669; 280/734, 735; 180/274, 282; 307/10.1

[56] References Cited

U.S. PATENT DOCUMENTS

| | | | |
|---|---|---|---|
| 3,863,208 | 1/1975 | Balban | 280/735 |
| 3,916,376 | 10/1975 | Tuttle | 280/735 |
| 5,023,468 | 6/1991 | Drobny et al. | 307/10.1 |
| 5,068,640 | 11/1991 | Burger et al. | 340/438 |
| 5,187,382 | 2/1993 | Kondo | 307/10.1 |
| 5,216,284 | 6/1993 | Mattes et al. | 307/10.1 |

*Primary Examiner*—Kevin J. Teska
*Assistant Examiner*—Tyrone V. Walker
*Attorney, Agent, or Firm*—Mark A. Navarre

[57] ABSTRACT

Large reserve capacitors store energy sufficient to operate the firing circuit and the deployment circuit for an SIR in the event of loss of battery or ignition voltage in a crash. A voltage doubling or tripling circuit charges the reserve capacitors. Normally the capacitors are isolated from the deployment circuit to minimize the load on the charging circuit. An isolation circuit detects the loss of ignition voltage and then connects a reserve capacitor to the deployment circuit for continued control operation.

1 Claim, 2 Drawing Sheets

ENERGY RESERVE CIRCUIT FOR SUPPLEMENTAL INFLATABLE RESTRAINT

FIELD OF THE INVENTION

This invention relates to automotive inflatable restraint systems and particularly to a provision for supplying electrical operating energy to such a system upon the loss of vehicle ignition voltage.

BACKGROUND OF THE INVENTION

In a supplemental inflatable restraint (SIR) system a deployment circuit normally includes a microprocessor and accelerometer for sensing when a crash occurs and actuating a firing circuit which inflates an air bag. The firing circuit includes a squib which is fired upon command of the microprocessor. Both the microprocessor and the firing circuit require an electrical energy source which is dependable during a crash. The SIR system is normally supplied by the vehicle ignition voltage which depends on the battery and in some cases the battery could become disconnected during a crash. Thus it is already known to provide an energy reserve which is sufficient to supply both the deployment circuit and the firing circuit for reliable operation during a crash.

A known system for providing an energy reserve comprises capacitors connected to both the deployment circuit and the firing circuit and a charging circuit for supplying energy from the ignition circuit to the capacitors. The capacitor voltage is preferably somewhat higher than normal ignition voltage to minimize the size of capacitors required for a given energy reserve. Accordingly, high current type switching regulators have been used for charging the capacitors and maintaining the operation of the deployment circuit. The high current source is required since the microprocessor and accelerometer normally draw about 40–50 mA of load current for continuous operation in addition to that needed to charge the energy reserve capacitors. It is, however, desirable to avoid the high expense of the switching regulators.

SUMMARY OF THE INVENTION

It is therefore an object of the invention to build and maintain an energy reserve for SIR operation without expensive charging circuitry.

The invention is carried out by using the ignition voltage to supply the deployment circuit separately from the energy reserve until a loss of ignition voltage occurs, and only then closing a switch to draw on the reserves for deployment circuit operation. An isolation circuit sensitive to the presence of the ignition voltage maintains the switch open to separate the energy reserve capacitors from the deployment circuit for normal operation; the switch is closed when the ignition voltage disappears. This allows a relatively inexpensive low current charging circuit to service the reserve capacitors.

Separate energy reserve capacitors are provided for the SIR deployment circuit and the firing circuit, and additional capacitors are used if there are additional firing circuits. An inexpensive voltage doubler or tripler, supplied by ignition voltage, builds up the voltage on the reserve capacitors in only a few seconds of operation and then maintains the maximum voltage. The deployment circuit is also supplied by the ignition voltage and is held in readiness to command firing of the firing circuit. The deployment circuit includes a voltage regulator, an accelerometer and a microprocessor which analyzes accelerometer output to determine crash severity and therefore decide whether to inflate the restraint. An isolation circuit includes a comparator for sensing ignition voltage, and a switch controlled by the comparator for connecting a reserve capacitor to the regulator when ignition voltage is lost, although normally the switch is open to isolate the reserve capacitors from the regulator. Thus the reserve energy is available when needed and the charging circuit is not taxed by the deployment circuit load.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to an embodiment of the invention in its simplest form; it will be understood that it may be expanded to embrace other forms with additional features. For example, the diagrams show a single squib and firing circuit served by a reserve capacitor but additional squibs and firing circuits, each with its own reserve capacitor may be added.

Figure 1:
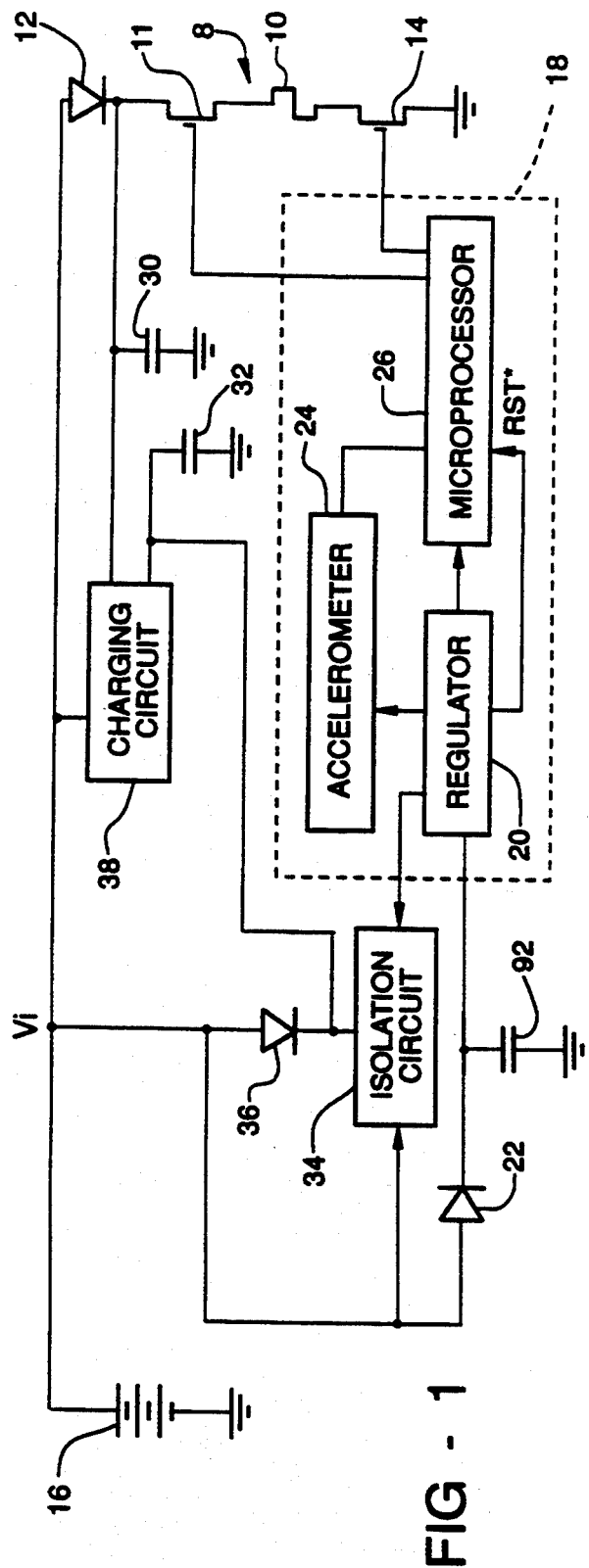
FIG. 1 is a schematic diagram for an SIR circuit including an energy reserve according to the invention.

Referring to FIG. 1, a firing circuit 8 comprises a squib 10 for inflating an air bag which is serially connected with a high side FET switch 11, a diode 12 and a low side FET switch 14 between a vehicle battery 16 (affording ignition voltage Vi) and ground. A deployment circuit 18 for sensing a crash and operating the FET 14 includes a voltage regulator 20 coupled to the battery 16 through a diode 22, an accelerometer 24 and a microprocessor 26. The regulator supplies a regulated 5 volts to the accelerometer and the microprocessor, as well as a reset signal RST* to the microprocessor. As is well known in the art, the microprocessor 26 analyzes the accelerometer output to determine crash severity and to operate the FET switches 11 and 14 when appropriate. A driver circuit, not shown, may be inserted between the microprocessor and the switches 11 and 14. The acceleration signal, during a crash is a rapidly oscillating signal which is analyzed by an algorithm to determine severity. A suitable microprocessor-based severity control is disclosed in the co-pending U.S. patent application Ser. No. 07/797,850, filed Nov. 26, 1991, assigned to General Motors Corporation, and which is incorporated herein by reference.

A reserve energy system includes a first reserve energy capacitor 30 connected between ground and the firing circuit containing the squib 10, a second energy reserve capacitor 32 connected between ground and an isolation circuit 34, the isolation circuit being connected to the deployment circuit 18. The battery voltage Vi is joined to the capacitor 32 and the isolation circuit 34 via a diode 36, as well as being directly connected to the isolation circuit. Finally, a charging circuit 38, connected to the battery 16, is coupled to both reserve capacitors 30 and 32 to charge them to a voltage higher than the battery or ignition voltage Vi. The higher voltage allows a smaller capacitor to be used for a given amount of stored energy.

Figure 2:
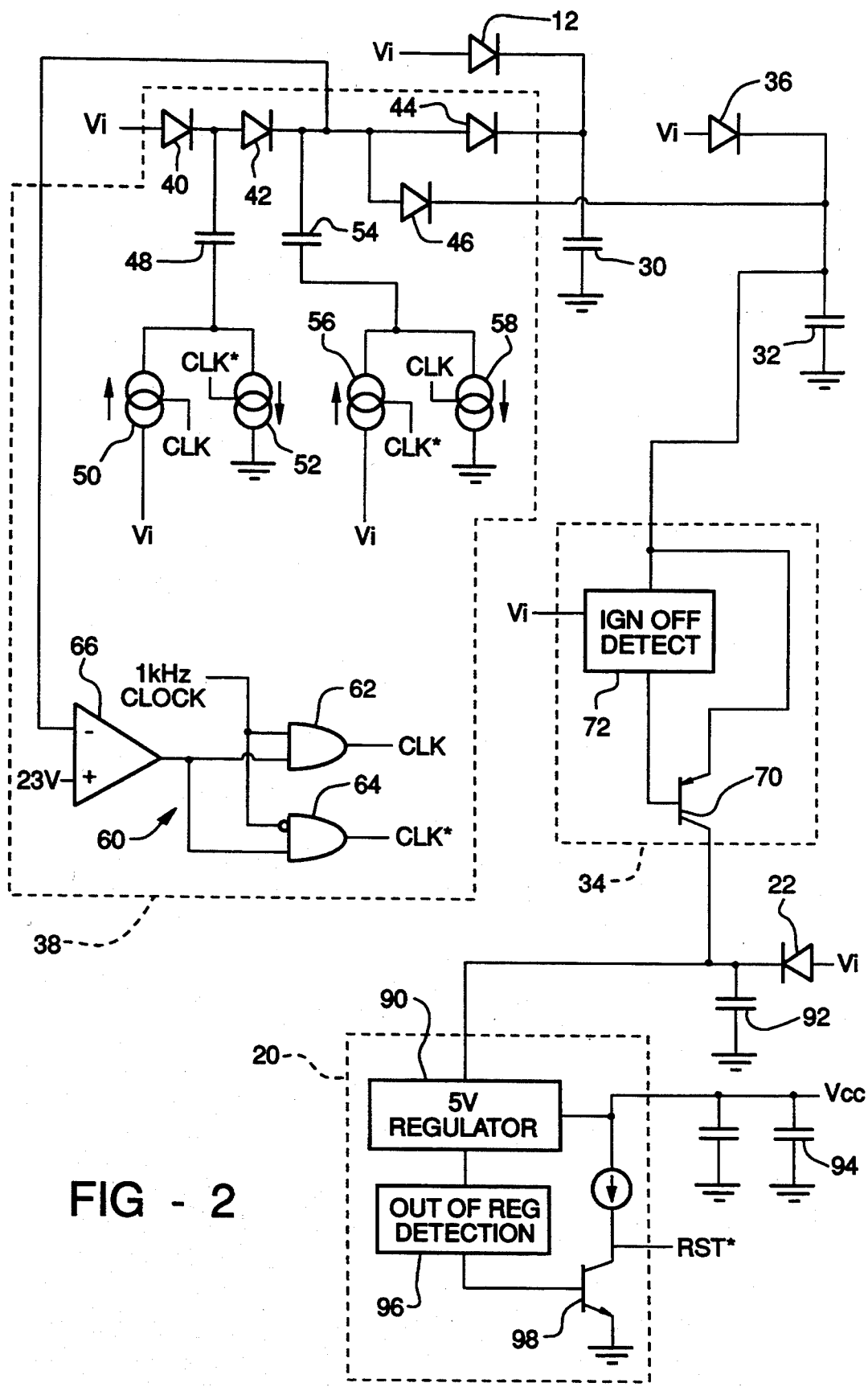
FIG. 2 is a detailed schematic diagram of a portion of the FIG. 1 circuit.

The charging circuit 38 is a voltage multiplier, preferably a doubler or tripler. As shown in FIG. 2, the charging circuit in the form of a voltage tripler comprises first and second diodes 40 and 42 in series with the ignition voltage Vi, a third diode 44 connecting diode 42 to the reserve capacitor 30 and a fourth diode 46 connecting diode 42 to the reserve capacitor 32. A first charge pump comprises a charging capacitor 48 connected at one side to the junction of diodes 40 and 42, a current source 50 and current sink 52 connected from the other side of charging capacitor 48 to Vi and ground respectively. A second similar charge pump includes a second charging capacitor 54 connected between the cathode of the diode 42 and the junction of a current source 56 and a current sink 58. An oscillator 60 provides complementary clock signals CLK and CLK* to the current sources and current sinks. The oscillator comprises a pair of AND gates 62 and 64 each having one input coupled to a 1 kHz clock, one of the inputs being an inverting input, and a second input connected to a comparator 66 output. When the comparator output is high, the clock signal alternately turns on the AND gates to produce out-of phase clock pulses CLK and CLK*. The comparator 66 has its positive input connected to 23 volts and its inverting input connected to the cathode of the diode 42. Thus the comparator output remains high to energize the AND gates so long as the inverting input is below 23 volts, and shuts off the oscillator for higher voltage.

In operation, during the first half of the clock cycle, when CLK is low, the current sink 52 and the current source 56 are on and the first charging capacitor 48 is charging while the second charging capacitor is discharging into the reserve capacitors. During the second half of the clock cycle, the first charging capacitor 48 is charging the second charging capacitor 54. The operation continues until the 23 volt limit is attained. For charging capacitors 48 and 54 of 120 $\mu$F, and 100 mA current sources, energy reserve capacitance of 20,000 $\mu$F can be charged to the limit voltage in about 5 to 10 sec.

Figure 3:
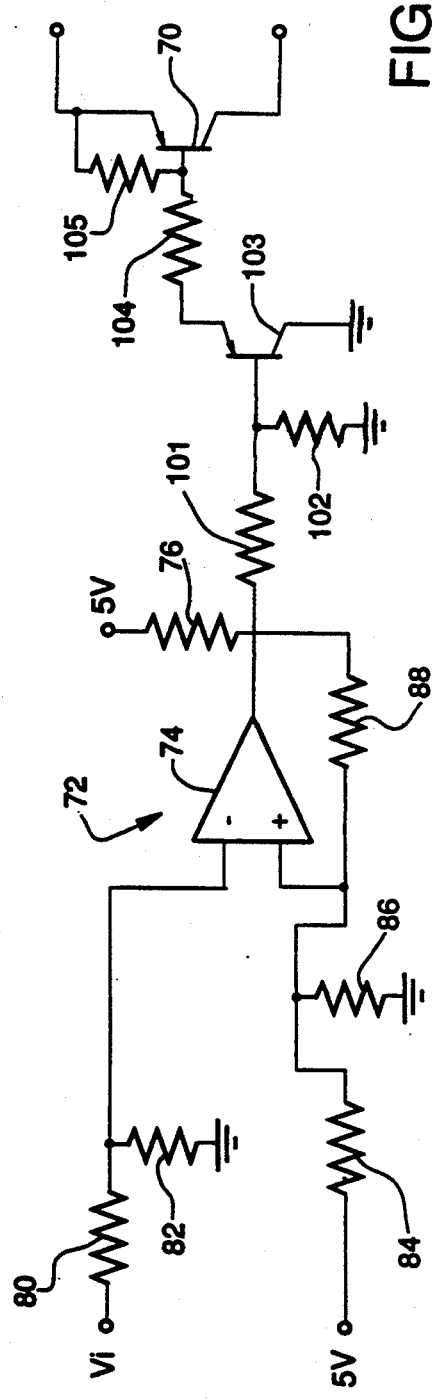
FIG. 3 is a schematic diagram of an isolation circuit used in the FIG. 1 circuit.

The isolation circuit 34 includes a transistor 70 selectively connecting the reserve capacitor 32 to the regulator 20 of the deployment circuit 18 and an ignition off detector 72 for monitoring the ignition voltage and turning on the transistor 70 when a loss of ignition voltage occurs. One implementation of an isolation circuit is shown in FIG. 3. There the ignition off detector includes a comparator 74 which has its high level output biased to 5 volts through resistor 76 and is connected through resistor 101 to the base of the transistor 103. Transistor 103 drives the base of transistor 70 through resistor 104. When the output of comparator 74 is low, the transistor 70 is off. Conduction through transistor 70 will occur when the output of comparator 74 goes high. The inverting input of the comparator 74 is coupled through input resistor 80 to ignition voltage Vi and through resistor 82 to ground, and the non-inverting input is connected through resistor 84 to 5 volts and through resistor 86 to ground to establish a threshold voltage. A feedback resistor 88 is connected between the non-inverting input and the output. Preferably the input resistors are adjusted to select the threshold voltage for comparator switching at an ignition voltage Vi of 6.5 volts, thus turning on transistor 70 when the voltage Vi, normally about 12 volts, falls to that level.

The regulator 20 includes a 5 volt regulator chip 90 having its input connected to Vi passing through the diode 22 and to the collector of the transistor switch 70, so that the regulator will be empowered after failure of Vi. A capacitor 92 is between the input and ground. Another capacitor 94 is coupled between the 5 volt output Vcc of the regulator and ground. The capacitors are large, say, 10 $\mu$F for capacitor 92 and 15 $\mu$F for the capacitor 94, so that both the regulator input and the Vcc output are sustained for a time after loss of ignition voltage in a crash. This sustained time is sufficient to maintain the 5 volt inputs to the comparator 74 for monitoring the loss of ignition voltage and turning on the switch 70. When the switch 70 is turned on the energy reserve capacitor 32 supplies enough electrical power to complete the deployment circuit function. The regulator 20 also includes an out-of-regulation circuit 96 which detects when Vcc is no longer supplied at its correct value and turns on a transistor 98 which connects the reset line to ground, thus asserting the signal RST* and causing the microprocessor to reset.

The embodiments of the invention in which an exclusive property or privilege is claimed are defined as follows:

1. In a supplemental inflatable restraint system wherein the system is normally supplied by a vehicle ignition voltage and is subject to loss of the ignition voltage during a crash, an energy reserve circuit comprising:

reserve capacitor means for storing electrical energy;
a voltage multiplier for charging the reserve capacitor means to a multiple of the ignition voltage;
a deployment circuit connected to ignition voltage with a voltage regulator for establishing a threshold voltage;
an isolation circuit connected between the deployment circuit and reserve capacitor means for comparing the ignition voltage to the threshold voltage and for coupling the reserve capacitor means to the deployment circuit when the ignition voltage falls below the threshold voltage, wherein the threshold voltage is maintained by the reserve capacitor means via the voltage regulator; and
a second capacitor means for maintaining a supply of voltage to the deployment circuit for the period after the ignition voltage falls below the threshold voltage but before the isolation circuit couples the reserve capacitor means to the deployment circuit.

* * * * *